(12) United States Patent
Tuli

(10) Patent No.: US 6,285,469 B1
(45) Date of Patent: *Sep. 4, 2001

(54) APPARATUS AND METHOD FOR FACSIMILE DESIGN

(76) Inventor: Raja Singh Tuli, 55 City Centre Drive Ste. 500, Mississauga, Ontario (CA), L5B 1M3

( * ) Notice: Subject to any disclaimer, the term of this patent is extended or adjusted under 35 U.S.C. 154(b) by 0 days.

This patent is subject to a terminal disclaimer.

(21) Appl. No.: 08/335,156

(22) Filed: Nov. 7, 1994

(51) Int. Cl.[7] .............................. H01M 1/40; G03G 15/00
(52) U.S. Cl. .............................. 358/472; 399/108
(58) Field of Search .................... 358/471, 472, 358/474; 400/691, 693; 399/108, 110; 248/371, 916, 918–923

(56) References Cited

U.S. PATENT DOCUMENTS

| | | | |
|---|---|---|---|
| 4,527,149 | * 7/1985 | Swensen | 400/682 |
| 4,735,394 | * 4/1988 | Facco | 248/371 |
| 4,856,748 | * 8/1989 | Obermeyer | 400/681 |
| 5,264,949 | * 11/1993 | Stemmle | 358/471 |
| 5,420,697 | * 5/1995 | Tuli | 358/472 |
| 5,469,327 | * 11/1995 | Cheng | 248/918 |

* cited by examiner

Primary Examiner—Peter S. Wong
Assistant Examiner—Gregory Toatley, Jr.

(57) ABSTRACT

A facsimile machine is to be made for portable applications with the added features of being light weight, slender and compact in design. A single drive roller which is fixed is used in moving media for the scanning and printing functions without the reversal of the roller to accomplish these tasks individually at separate times or simultaneously. The slender profile of the present device with the base narrower than the height makes it very unstable in its upright operating mode. Arms pivoted at each end rotate and lock into an opened position thus providing a stable position for the device in which it is no longer vertically upright, but supported at an angle by the arms where print media can enter without difficulty and scanned documents can also be fed without obstruction by the print media roll. The arms lock into a closed position in which they follow the contours of the main body as an extension of the device without any noticeable protrusions. Locating the print media, either in sheet form or roll form, with respect to the printer of the device, is accomplished by alignment projections on the main body which guide the media into its correct position over the print head, and also prevent the roll or sheet from sliding perpendicular to its direction of travel.

2 Claims, 5 Drawing Sheets

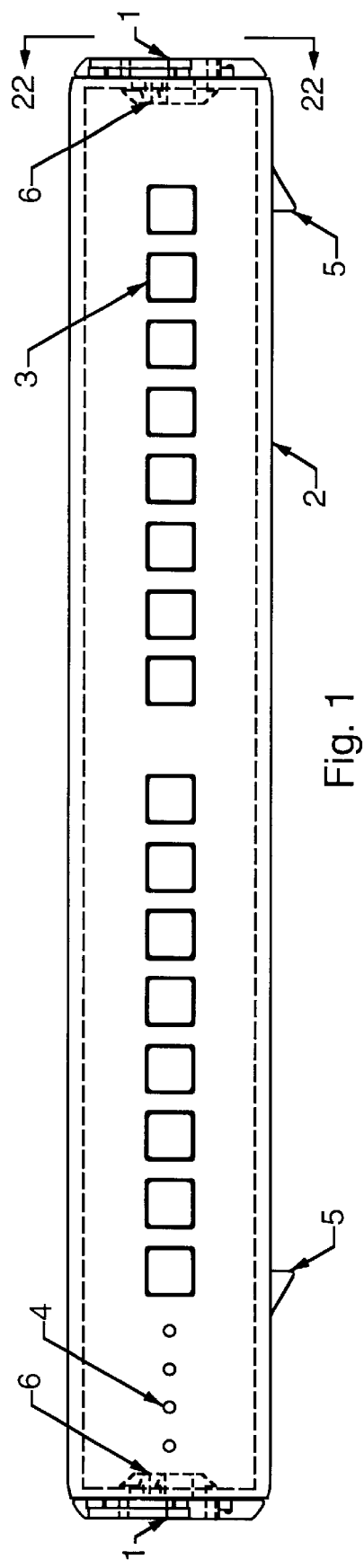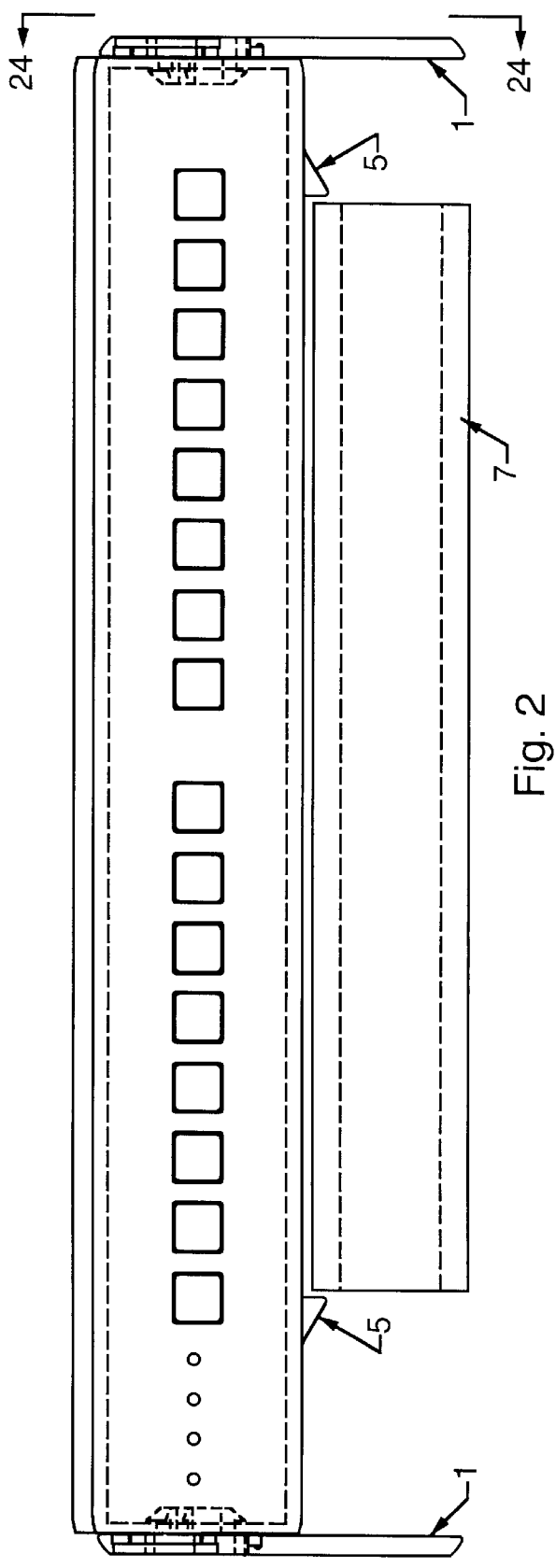

APPARATUS AND METHOD FOR FACSIMILE DESIGN

BACKGROUND OF THE INVENTION

The present invention relates to an apparatus and a method for a portable facsimile machine design. The device in particular, relates to a slender shape which is unstable in its upright operating mode without the aid of rotating arms that pivot at both ends. These arms lock in an open position to provide necessary stability during operation and also lock in a closed position to minimize occupied space during transportation and storage. In the closed position, the arms follow the profile and contours of the ends forming an extension of the main body's shape without any noticeable projections.

Conventional facsimile components and communication methods are utilized by the invention. What is unique about the invention is the fact that a single drive roller is utilized for scanning, printing, facsimile and copying as disclosed in prior art by the Inventor Raja S. Tuli in application No. 08/020,368, now U.S. Pat. No. 5,420,697, is herein incorporated by reference. Multiple drive rollers and motors, or reversal of the main drive roller for scanning and printing operations, are not required as found in conventional methods, since the scanned document and the printed media move in parallel planes in opposite directions on opposite sides of the single drive roller, in accordance with the present invention. The thermal sensitive print media, either sheet feed or roll form, is externally stored enabling compact lightweight design and portability.

An object of the present invention is to provide a design for a portable means of facsimile and copying documents with external media feed and storage. The external surface of the main body is fitted with contoured projections to correctly position and guide an external thermal sensitive paper roll, which by the nature of the design and direction of travel of the paper, rotate the paper roll snugly against the body of the device without the need for additional fixation means.

SUMMARY OF THE INVENTION

Generally speaking, in accordance with the present invention, a portable facsimile and copier is constructed having properties of lightweight, slim design, and unique operational stability arms. The device has portable practical applications as a facsimile and copy machine, with the added features of external media storage and positioning means.

The heart of the invention lies in the rotating arm mechanism. Only one roller is used in the invention to drive the printer and also the scanner, individually at separate times or simultaneously as required. This significant accomplishment in reducing power and space requirements considerably for this machine, as only one motor is required instead of two or more, was achieved by positioning the scanner and print head on opposite sides of the single drive roller. The thermal sensitive print media and scanned document traverse in parallel planes, in opposite directions, and on opposite sides of the drive roller. Due to the slender profile of the present device with the base narrower than the height, it becomes very unstable in its upright operating mode. To solve this problem, arms pivoted at each end rotate and lock into an opened position thus providing a stable position for the device in which it is no longer vertically upright, but at an angle where print media can enter without difficulty and scanned documents can also be fed without obstruction by the print media roll. The arms lock into a closed position in which they follow the contours of the main body as an extension of the device without any noticeable protrusions.

Locating the print media, either in sheet form or roll form, with respect to the printer of the device, is accomplished by alignment projections on the main body which guide the media into its correct position over the print head, and also prevent the roll or sheet from sliding perpendicular to its direction of travel.

BRIEF DESCRIPTION OF DRAWINGS

This invention may be better understood and its numerous objects and advantages will become apparent to those skilled in the art by reference to the accompanying drawings as follows:

FIG. 1 is an overhead view illustrating the position of the arms locked in their closed position and also the print media guides as disclosed in the present invention.

FIG. 2 is an overhead view of the device with the arms locked in the open position and also a print media roll positioned between the guides, in accordance with the present invention.

Figure 3:
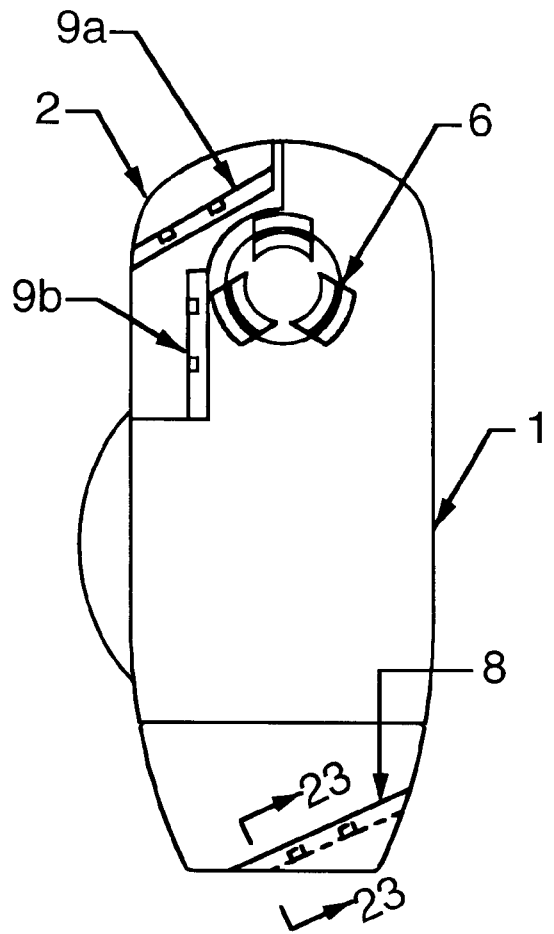
FIG. 3 is an end view along the line AA of FIG. 1 of the device with the arms closed to facilitate storage and transportation, in accordance with the present invention.

DETAILED DESCRIPTION OF PREFERRED EMBODIMENTS:

Reference is made to FIG. 1, which is a top view of the general layout of the device illustrating the arms 1 in their closed position with respect to the main body 2. When locked in their closed position, the arms follow the contours of the body to form an unnoticeable extension of the body as a closely fitted extension of the device. The location of the center of gravity of the device renders this closed position of the arms unstable as it can easily topple over, in its upright operating position. The entry keys 3 and function indicators 4 are also visible from the top, with the print media guides 5 projecting beyond the main body. The arms are fitted with a hinge 6 about which they pivot on the ends of main body.

Reference is now made to FIG. 2, which is the device of FIG. I illustrating the arms 1 in their opened position. When locked in their opened position, the arms provide the necessary stability for the device seated on a flat surface so that it does not topple over during operation. With the arms opened, the device is reclined at an angle and is no longer vertically upright, but facilitates feeding of the print media and the scanned document without obstruction. The print media guides 5 are shown to provide a positioning means for the roll 7 and also prevent the roll from sliding parallel to the long axis of the device, as the media travels perpendicular to this axis.

Referring to FIG. 3, which represents an end view of the invention, the arm 1 in its closed position follows the shape of the main body 2 and locks into position via the locking means 8 which also acts as a limit stop for the arm in closing. The hinge 6 is an integral part of the arm and is pivoted about a hole in the body. The locking devices 9a & 9b for the opened position of the arms are illustrated and also act as a limit stop for the arm in opening.

Figure 4:
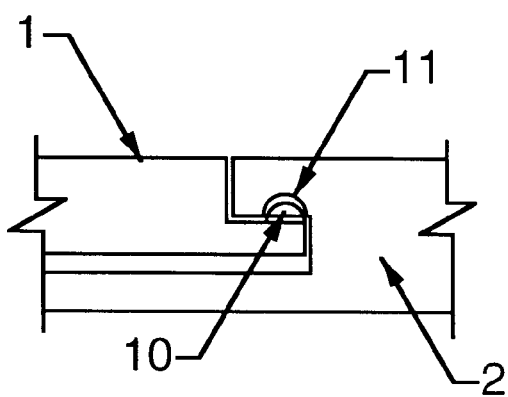
FIG. 4 is an enlarged sectional view along the line BB of FIG. 3 of the device illustrating the locking device closed, in accordance with the present invention.

FIG. 4 represents an enlarged section across the locking means for the arm 1 to the body 2. A small protrusion 10 fits into a mating cavity 11 to provide a locking means which can snap into and snap out of its locked position without excessive force. The angle at which the arm and body contact each other in the closed position is identical and form a limit stop for the arm in closing.

Figure 5:
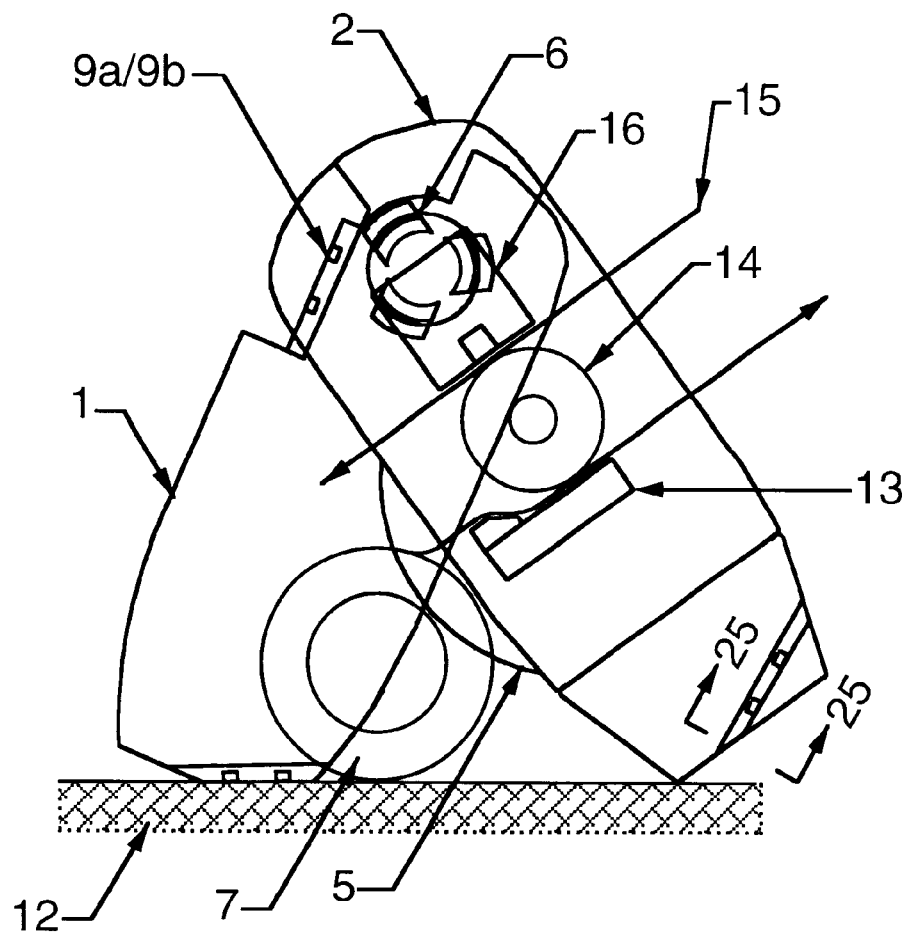
FIG. 5 is an end view along the line CC of FIG. 2 illustrating the device with the arms locked in the opened position to provide stability when placed on a flat surface, and also the feed path of print media and the scanned document with the cation of printing and scanning components shown, in accordance With the present invention.

Reference is now made to FIG. 5, which is an end view of the invention illustrating the arm 1 in the opened and locked position of FIG. 2. When placed on a moderately level surface 12, the device becomes stable to perform all operating functions as the center of gravity is shifted along a wider base support. The arm rotates about the hinge 6 to provide sufficient space under the main body 2 and the level surface 12 to store a thermal sensitive print media roll 7. Guides 5 correctly position the print media with the print head 13 which prints a line of dots at a time parallel to the drive roller 14, which also functions as the print roller. The scanned document 15 traverses parallel to the print media on opposite sides of the drive roller, in opposite directions, across a scan head 16 which reads the document one line at a time. The locking devices 9a/9b fix the arms in an open position and also stop the arms from opening further. The force of the drive roller 14 pulls the roll of print media 7 from the top causing the roll to always rotate and move in a direction towards the main body 2, keeping it snugly against the body at all times during printing without the need for additional fixation devices, thus allowing the guides 5 to function in restraining the roll from sliding perpendicular to the direction of travel of the print media and correctly positioning the media with the print head.

Figure 6:
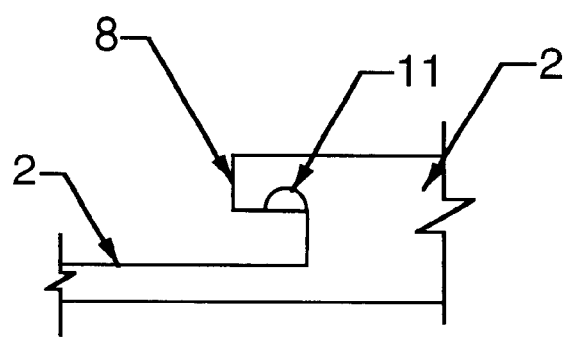
FIG. 6 is an enlarged sectional view along the line DD of FIG. 5 of the device illustrating the locking device opened, in accordance with the present invention.

FIG. 6 represents an enlarged sectional view across the limit stop projection 8 located at the bottom corners of the main body 2. This stop prevents the arms from rotating past the closed position where they conform to the exact shape of the end view of the main body. A cavity 11 exists in the main body at the stop location as part of the locking device into which a mating protrusion fits, located on each arm.

Figure 7:
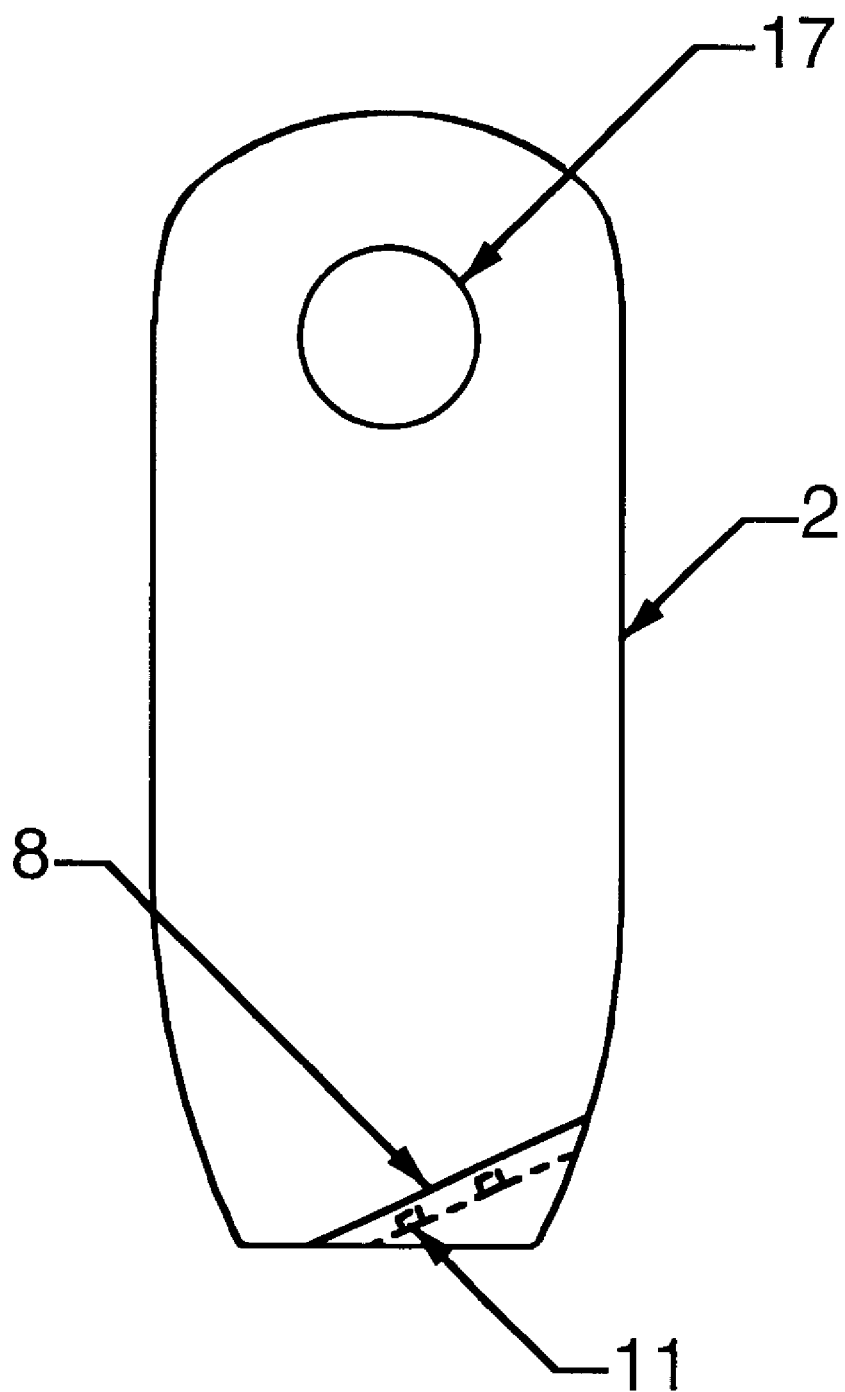
FIG. 7 is an end view along the line AA of FIG. 1 with the arm removed to illustrate the end plate of the device, in accordance with the present invention.

Referring to FIG. 7, which represents an end view of the main body 2 of the invention with the arms removed, the pivot hole for the hinge 17 is illustrated into which the hinge, located on each arm as an integral part, is inserted and snaps into position by nature of the design of the hinge. The limit stop projection 8 and locking cavities 11 are both integral parts of the main body 2.

Figure 8:
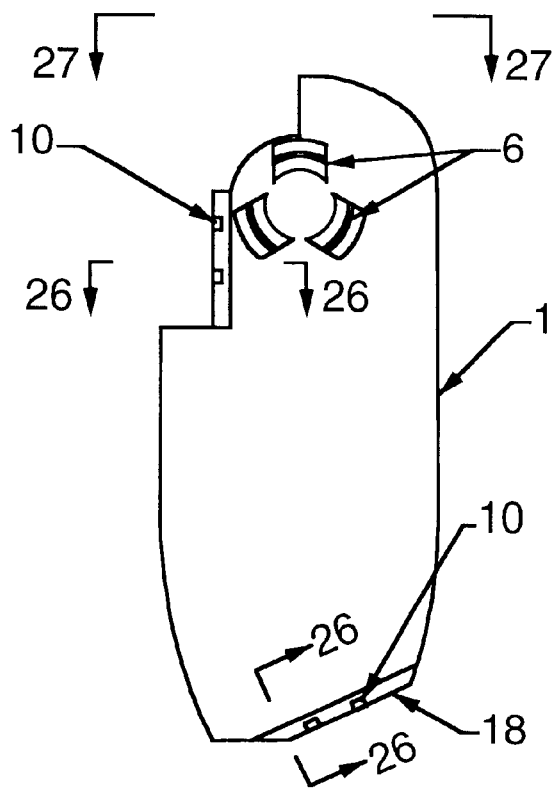
FIG. 8 is an illustration of the arm removed from the device, in accordance with the present invention.

Referring now to FIG. 8, which represents an arm 1 of the invention removed from the main body, the hinge 6 is comprised of curved segments separated by narrow gaps in a circular arrangement. These gaps are present to allow the hinge to bend inward when inserting into the pivot hole for the hinge on the main body. The protrusions 10 which form part of the locking device are an integral part of the arms and fit into the mating cavities of the limit stops on the main body. The angle of the surface 18 on the arm mates exactly with the corresponding limit stop on the main body providing continuity between parts, yielding an aesthetic close fitting of the arms to the limit stops on the main body in both the opened and closed positions.

Figure 9:
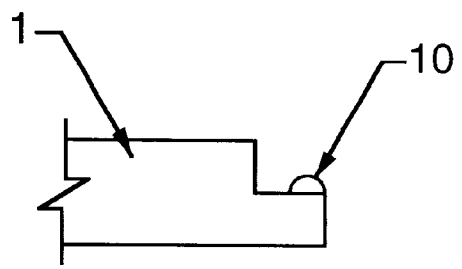
FIG. 9 is an enlarged sectional view along the lines EE of FIG. 8 of the device illustrating the projections of the arm's locking means, in accordance with the present invention.

FIG. 9 represents an enlarged view of the arm's protrusion 10 which forms part of the locking device as an integral part of the arm 1. These protrusions mate with cavities in the main body to lock the arms into position without excessive force, and can just as easily unlock.

Figure 10:
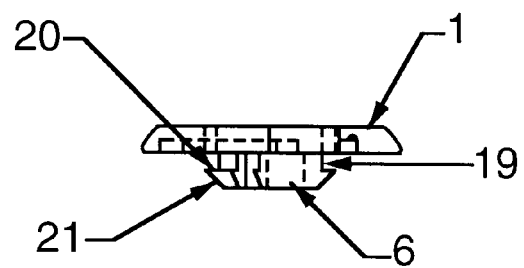
FIG. 10 is a view along the line FF of FIG. 8 of the device illustrating the arm's pivoting means, in accordance with the present invention.

Referring to FIG. 10, which represents an end view of the hinge 6 located on the arm 1, there is a segmented shaft 19 of diameter mating with the pivot hole 17 in the main body of FIG. 7. A flat surface 20 projecting beyond the periphery of the segmented shaft is present to secure the arm into position yet allow rotation about the pivot hole after the arm's hinge is inserted into the hole. To facilitate a forced entry of the hinge into the hole, as the outer diameter of surface 20 is larger than the pivot hole, a tapered surface 21 is introduced which bends the hinge segments inward upon inserting into the hole. The hinge segments return to their straight rest position as surface 20 passes the inside wall of the main body, locking the arm onto the main body free to rotate about the hinge.

It is also understood that the following claims are intended to cover all of the general and specific features of the invention herein described, and all statements of the scope of the invention which, as a matter of language, might be said to fall therebetween.

I claim:

1. A device capable of printing and scanning using a single roller to accomplish both tasks in which:
    the printing is accomplished through the use of a printer with a thermal print head which prints a single line of dots parallel to the roller;
    the said printer prints on thermal sensitive paper which is sandwiched between the roller, which is fixed, and the said thermal print head such that the said thermal sensitive paper moves in a prescribed first direction;
    a scanner with a scan head which senses a linear array of dots at a time parallel to the roller, is situated on the opposite side of the roller to the printer;
    the scanner senses dots that are located on an original when the original is pressed against the roller by the scan head, which is springed against it allowing scanning in two dimensions as paper is moved by the roller such that the original moves in a direction opposite to the prescribed first direction;
    a single drive roller is used for the scanning and printing functions without the reversal of the single drive roller to accomplish these tasks individually at separate times or simultaneously;

in its upright operating mode the base is narrow compared to the height making the device unstable in this position;

arms that follow the contours of the ends of a main body when closed are pivoted at each end to rotate into an open position to provide necessary support during operation;

the said arms when opened tilt the device at an angle to facilitate feeding of the original document through the device from one side without obstruction from a print media roll on the other side;

the said arms have protrusions that interface with matching cavities on the main body to keep the arms fixed into an opened position and also a closed position.

2. A device as claimed in claim 1 in which:

guides exist as protrusions on the body of the device at both ends of the print media roll where it is feed and stored at a height where said guides can correctly position the media with the print head;

the force of the drive roller pulls the roll of print media from the top causing the roll to always rotate and move in a direction towards the main body keeping it snugly against the body at all times during printing allowing the said guides to function in restraining the roll from sliding perpendicular to the direction of travel of the print media.

* * * * *